United States Patent [19]

Davis et al.

[11] Patent Number: 5,019,132

[45] Date of Patent: May 28, 1991

[54] PROCESS FOR THE PREPARATION OF CONCENTRATED 1:2 METAL COMPLEX DYE PREPARATIONS

[75] Inventors: Herb Davis, Forked River, N.J.; Charles R. Wetzel, High Point, N.C.

[73] Assignee: Ciba-Geigy Corporation, Ardsley, N.Y.

[21] Appl. No.: 442,101

[22] Filed: Nov. 28, 1989

[51] Int. Cl.$^5$ .................. C09B 67/54; C09B 45/01
[52] U.S. Cl. .................................. 8/527; 8/685
[58] Field of Search ........................... 8/527, 685

[56] References Cited

U.S. PATENT DOCUMENTS

| | | | |
|---|---|---|---|
| 2,732,372 | 1/1956 | Kuster et al. | 8/685 |
| 2,887,477 | 5/1959 | Straley et al. | 8/685 |
| 2,909,515 | 10/1959 | Ruckstuhl et al. | 8/685 |
| 2,919,269 | 12/1959 | Nickel et al. | 8/685 |
| 2,938,896 | 5/1960 | Strobel et al. | 8/685 |
| 3,102,110 | 8/1963 | Schetty | 8/685 |
| 3,221,004 | 11/1965 | Neier | 8/685 |
| 3,417,074 | 12/1968 | Kühne et al. | 8/685 |
| 3,492,285 | 1/1970 | Machatzke | 8/685 |
| 3,704,086 | 11/1972 | Bayew et al. | 8/527 |
| 3,989,452 | 11/1976 | Hugelshofer | 8/527 |
| 4,000,965 | 1/1977 | Mennicke et al. | 8/527 |
| 4,452,608 | 6/1984 | Erzinger | 8/527 |
| 4,525,170 | 6/1985 | Balliello | 8/685 |

FOREIGN PATENT DOCUMENTS 2127669 4/1970 Fed. Rep. of Germany ......... 8/527
3631754 3/1988 Fed. Rep. of Germany.

*Primary Examiner*—Paul Lieberman
*Assistant Examiner*—J. E. Darland
*Attorney, Agent, or Firm*—George R. Dohmann; Edward McC. Roberts

[57] ABSTRACT

Stable, concentrated, liquid preparations of 1:2 metal complex azo or azomethine dyes containing at most one sulfonic acid group are obtained by metallizing the metal-free azo or azomethine intermediates in form of their moist, almost salt-free washed, filter cakes with aqueous slurries of complex forming, preferably cobalt or chromium salts. Without isolation of the thus obtained metal complex dyes the dye slurries are then in situ converted into the stable, concentrated dye preparations by adjusting them to a final dye concentration.

The dye preparations are produced in a very economic manner by avoiding any isolation of the metal complex dyes after the metallization step and by considerably reducing the amounts of effluents.

The dye preparations obtained are suitable for the preparation of dye-baths or printing pastes which may be used in particular for dyeing and printing textile materials made of natural or synthetic polyamide fibres, and further of leather and paper.

20 Claims, No Drawings

PROCESS FOR THE PREPARATION OF CONCENTRATED 1:2 METAL COMPLEX DYE PREPARATIONS

BACKGROUND OF THE INVENTION

The present invention relates to a process for the preparation of stable, water-miscible, concentrated solutions of micro-dispersions of 1:2 metal complex azo or azomethine dyes and the obtained concentrated dye solutions/micro-dispersions which are useful in the field of dyeing and printing fibrous materials.

It is known to use metal complex dyes in the form of concentrated stock solutions or as finely ground powders for the preparation of dyebaths or printing pastes useful for dyeing and printing various substrates, such as for example textile fibers, leather, or paper. Numerous methods for preparing stable metal-complex dye solutions or dispersions have been proposed in the patent literature, such as for example using organic solvents (U.S. Pat. No. 3,989,452), adding alkaline lithium salts when metallizing non-metallized dyes (U.S. Pat. No. 4,000,965), or membrane separation techniques for desalting and thus stabilizing said dye preparations (U.S. Pat. No. 4,452,608).

Although all these methods have their merits they nevertheless still suffer from shortcomings such as undesirable solvent vapors during preparation and use of said dye preparations, when organic solvents are used; stability and degradation problems when using e.g. lithium salts; time and energy consuming desalting methods; or production of too large amounts of undesired effluents, which need extensive equipment to clean them.

The problem that the present invention is based on, is how to reduce or overcome these shortcomings of the processes for preparing the state-of-the-art dye compositions.

It has now been found that this problem can be solved by providing a new process for the preparation of stable, concentrated preparations of 1:2 metal complex dyes which comprises separating the metal-free dye species from their synthesis slurries followed by a metallization step and the in situ forming of the dye preparations, without isolating the metal complex dyes after metallization.

DETAILED DESCRIPTION OF THE INVENTION

Therefore, it is one object of the present invention to provide a process for the preparation of stable, concentrated preparations of 1:2 metal complex azo or azomethine dyes with at most one sulfonic acid group, which comprises the steps of (a) separating a metal-free azo or azomethine intermediate capable of complex-formation by precipitating said intermediate from its aqueous reaction slurry at higher temperatures and at a pH or 1.0 to 7.0, and washing it with water to form a moist filter cake of low salt-content, (b) metallizing said intermediate as is by combining said filter cake at higher temperatures and with stirring with an aqueous slurry of a complex-forming metal salt, and (c) processing the dye solution or micro-dispersion obtained in step (b) in situ to form a stable, concentrated liquid preparation of 1:2 metal complex azo or azomethine dyes.

Further objects of the present invention relate to the liquid and solid dye preparations produced as well as their uses in dyeing processes for various substrates.

These and other objects of the present invention will become apparent from the following detailed description.

The dyes of the inventively prepared stable, concentrated preparations are for example 1:2 nickel, copper and iron complexes, but preferably 1:2 cobalt or 1:2 chromium complexes of azo or azomethine dyes of for example the benzene-azobenzene, naphthalene-azonaphthalene, benzene-azonaphthalene, benzene-azopyrazolone, benzene-azopyridone or benzene-acetoacetamide (anilide) series, or the corresponding azomethine series, which contain as complex-forming moieties e.g. o,o'-dihydroxy-, o-hydroxy-o'-amino, o-hydroxy-o'-alkoxy-, o-hydroxy-o'-carboxy-, o,o'-dihydroxy-, o-alkoxy-o'-aminoazo or -azomethine groups. The complex-forming azo dyes can be mono- or polyazo dyes, the monoazo dyes are preferred. The dyes may be free from non-complex-forming acid groups, such as sulfonic or carboxylic acid groups, or they may contain one or more such (water-solubilizing) groups, especially sulfonic acid groups. Other substituents that may be present are unsubstituted or substituted carbamoyl or sulfamoyl, nitro, or halogen.

The 1:2 metal complex dyes can be both symmetrical and asymmetrical complexes, that is two identical or different complex-forming dyes may be bonded as chromophoric ligands to the central metal ion. Mixtures of 1:2 metal complex dyes, such as produced by mixed metallization of two or more complex-forming dyes can also be used. In the process of the present invention the 1:2 metal complex dyes containing at most one sulfonic acid group may be present in the free acid from ($-SO_3H$) or preferably in the form of their akalimetal-/alkaline earth metal, amine or ammonium salts, such as for example the sodium, potassium or magnesium salts, further ammonium or alkanolamine (e.g. di- or triethanolamine) salts.

The metal-free azo or azomethine dyes (intermediates) capable of complex-formation ar prepared by conventional methods, e.g. diazotization and coupling, know to the artisan and described in the corresponding patent literature and in the Colour Index (C.I.) published by the Society of Dyers and Colorists, as (metallized) acid dyes. The dye synthesis is carried out without the use of organic solvents.

According to step (a) of the inventive process, however, a particular separation of these intermediate is needed which comprises the precipitation of the intermediates from their aqueous reaction slurries at acid pH-values in the range of 1.0 to 7.0, preferably of 1.0 to 6.0 and most preferred of 2 to 5, and at higher temperatures, viz. at about 40° to 100° C. and preferably 50° to 90° C.

The pH can be adjusted by the (slow) addition of common organic or preferably inorganic acids, such as sulfuric or preferably hydrochloric acid.

The precipitates are then washed with water, as a rule cold water, and then filtered, for example in a conventional filter press. Moist filter cakes of solids contents in the range of 40° to 60° % by weight but of low salt content (less than about 1% calculated on a dry basis) are obtained.

The moist filter cakes of the metal-free intermediates are then metallized as is that is as such, without being subjected to further treatment, for example mechanical, physical or chemical treatments, according to step (b) of the inventive process by adding them with stirring to an aqueous solution of a complex-forming metal salt. The metallization is carried out at higher temperatures, for example at about 40° to 100° C., preferably 50° to 90° C., or most preferred at 60° to 80° C. The pH-value during metallization can be kept in the range of about 3 to 13, depending on the metal salts used. It is adjusted by the addition of suitable and commonly used (inorganic) acids or bases.

Examples of complex-forming metal salts are nickel, copper, iron and preferably cobalt and chromium salts of inorganic or low molecular weight organic acids, such as salts of mineralic acid—hydrofluoric, hydrochloric, sulfuric, or carbonic acid—or of formic, acetic, or salicylic acid.

Possible cobalt salts are cobalt carbonate, cobalt chloride, cobalt sulfate, cobalt formiate and cobalt acetate; chromium salts may be chromium fluoride, chromium chloride, chromium sulfate, potassium or ammonium chromium sulfate, chromium formate, chromium acetate or chromium salicylic acid.

These salts are applied in amounts carefully adjusted to the stoichiometry of the 1:2 mole ratio of the complex-forming metal and the azo/azomethine intermediate. Optionally and preferably a minimum excess of the metal (metal salt) can be used.

The metallization can be carried out in the presence of further additives, such as oxidizing agents, for example m-nitrobenzene sulfonic acid, or dispersants and surfactants, e.g. lignin sulfones, and condensation products of optionally substituted naphthalene sulfonic acids and formaldehyde; condensation products of optionally substituted phenol- or cresol sulfonic acids and formaldehyde; ethylene oxide adducts of fatty alcohols or amines, further of long-chain alkylphenols, as well as their half-esters with for example sulfonic acid; sulfonation products of castor oil etc.

The liquid dye preparation obtained in step (b) are—as a rule and depending on the chemical and physical properties of the dyes involved—in the form of aqueous solutions, aqueous micro-dispersions or suspensions.

These dye preparations can be further subjected to a wet-grinding in order to better homogenize them and to improve their stabilities and application properties. Wet-grinding is performed in common devices (mills) well known in the art.

According to step (c) of the inventive process the dye solutions or micro-dispersions of step (b) can then be processes in situ to the inventive (storage)-stable, concentrated liquid preparations of 1:2 metal complex azo or azomethine dyes. No isolation of the complex dyes after metallization is necessary.

For step (c) it is necessary to adjust the dye solution/micro-dispersion to a specific final dye concentration by dilution and/or with the aid of extenders, optionally after the addition of ingredients conventionally employed for liquid dye formulations, such as dispersants, surfactants, buffers, foam inhibitors, textile auxiliaries, humectants, liquefying agents, antifreeze agents and/or microbicides (fungicides).

The dye content of these stable liquid preparation can be in the range of about 10 to 35, preferably 15 to 25% by weight, calculated on the weight of the whole liquid preparation.

The liquid dye preparations obtained in step (b) can also be converted into the inventive stable, solid dye preparations by removal of water, which is performed by conventional drying, preferably by spray-drying, optionally after the addition of ingredients such as binders, dust inhibitors, solubilizers, dispersants, buffers and/or extenders.

The dye content of these stable, solid preparations can be in the range of about 50 to 90, preferably 60 to 75% by weight, calculated on the weight of the whole solid preparation.

The advantages provided by the inventive process for preparing stable, concentrated preparations of 1:2 metal complex dyes can be summarized as follows:

No organic solvents are needed, neither in the synthesis of the dyes nor during complexation and forming of the dye preparations. The metal-free intermediates are washed to low salt content without phase separation and are then subjected to metallization. The isolation of the filter cake of the metal-free intermediates advantageously leads to effluents which are characterized by very low contents of organic carbon and which are free of heavy metal ions. They can be easily treated with for example activated carbon. P The moist filter cake of these intermediates can be used as is for the metallization carried out in an aqueous medium; this aqueous slurry is then be used in situ for preparing the inventive stable, concentrated liquid or solid dye preparations.

It is not necessary to isolate the metal complex dyes after the metallization step. Considerable amounts of effluents contaminated with heavy metal salts are thus avoided.

The inventive process leads to stable (physically and chemically stable) dye preparations in good yields and high concentrations.

The 1:2 metal complex dye preparations prepared according to the present invention may be used for the preparation of dyeing liquors or printing pastes for the dyeing and printing of textile materials made of for example natural polyamide fibers (wool), especially synthetic polyamide fibers, and further of leather and paper.

The invention is illustrated by the following examples, but is not limited thereto. Parts and percentages are by weight unless stated otherwise. The temperature is indicated in degree centigrade.

EXAMPLE 1

Diazotization and coupling

To a stirred slurry of 210 parts of 2-aminophenol-4-sulfonamide in 400 parts of water and ice, 170 parts of hydrochloric acid (31%) is added. After about 10 minutes agitation to dissolve the amine hydrochloride, the solution is cooled to 0° to 2° C. and then 220 parts of an aqueous sodium nitrate solution (35%) is added. The temperature of the diazo slurry rises to about 20° C. An excess of sodium nitrite is maintained for 20 minutes and then destroyed with sulfamic acid and the dizaonium salt is cooled to 12° C.

Separately, with stirring, to a mixture of 470 parts of water at 25° C., and 230 parts of 3-chlorophenylmethylpyrazolone, 400 parts of aqueous sodium hydroxide solution (30%) is added. The mixture is stirred to a solution in about 15 minutes and then cooled to 15° C.

Just before coupling, the 2-aminophenol-4-sulfonamide diazo slurry is adjusted to pH 2.8 to 3.5 with about 30 parts of aqueous sodium hydroxide (30%). Then the 3-chlorphenylmethylpyrazolone coupler with the excess sodium hydroxide (30%) is added rapidly to the aforementioned diazo solution. The temperature of the coupling is 22° to 25° C. and the pH>12.0. The pH is maintained at 12.0 to 12.5 with about 100 parts of an aqueous sodium hydroxide solution (30%) as needed. The coupling mixture is stirred about one hour until a test with ammoniacal resorcinol shows no diazo present.

Separation step

The completed coupling mixture is then heated to 70° to 75° C. and adjusted to a pH of 5.0 to 5.3 by the slow (over one hour) addition of 400 parts of hydrochloric acid (31%). The precipitated monoazo slurry is filtered at 70° to 75° C. Then the filter cake is washed with 2500 parts of cold water and sucked down to a firm cake. Approximately 1100 parts of press cake are obtained with a solids content of 42% and 93% purity (calculated on a molecular weight of the dye of 408). The water content of the dried monoazo dye is about 5% (Karl-Fischer test). The yield of the monoazo dye is 95% of theory.

Metallization step

To a stirred solution of 58 parts of m-nitrobenzene sulfonic acid in 300 parts of water at 60° C., 610 parts of an aqueous cobalt sulfate solution (8% Co) are added. This is stirred for 10 minutes and then about 75 parts of aqueous sodium hydroxide solution (30%) is added to a pH of 10.0 to 11.0. Then 1650 parts of monoazo cake is added over about 50 minutes. The temperature is maintained at 60° to 65° C. and the pH at 11.0 to 11.3 with additional 550 parts of aqueous sodium hydroxide solution as needed. Stirring is continued for one hour after the pH is stable.

3100 parts of reaction mass slurry (33% solids content) of the yellow 1:2 cobalt azo dye of the formula

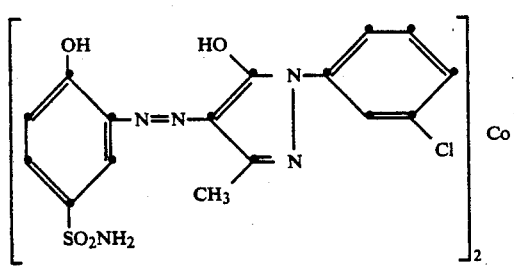

is obtained.

This dye slurry is then formulated into a (commercial) liquid dye preparation by milling a composition of

| | |
|---|---|
| 58.6% | of the dye slurry |
| 0.15% | of a fungicide |
| 0.25% | of a 50% solution of 2,4,7,9-tetramethyl-5-decyne-4,7-diol (antifoaming agent) in ethylene glycol |
| 1.0% | of lignin sulfonate |
| 40.0% | of water |
| 100.0% | | for one hour in an agitation kettle at ~350 pm using 4 mm glass beads.

The completed liquid dye preparation is obtained by filtering off the glass beads on a 60 mesh stainless steel screen.

This dye preparation is of excellent (storage) stability and can be diluted with water in all proportions, e.g. when preparing dye baths. Instead of the dye of formula (1) C.I. Acid Yellow 116, C.I. Acid Red 251, C.I. Acid Red 182 or C.I. Acid Blue 171 can be used.

EXAMPLE 2

Diazotization and coupling

To a stirred slurry of 300 parts of 2-aminophenol-4-sulfonamide in 600 parts of water and 242 parts of hydrochloric acid (31.5%) is added. After about 10 minutes agitation to dissolve the amine hydrochloride, the solution is cooled to 0° to 2° C. and then 323 parts of an aqueous sodium nitrite solution (35%) are added over a period of about 15 minutes. The temperature rises to 30° to 35° C. An excess of sodium nitrite is maintained for 20 minutes (as indicated by a deep blue color on starch-iodide paper). Excess sodium nitrite is then destroyed with sulfamic acid and the diazonium salt slurry is cooled to about 13° C.

Separately, 200 parts of an aqueous sodium hydroxide solution (30%) are added with stirring to 298 parts of acetoacetanilide in 600 parts of water of 50° C. The mixture is stirred for 10 to 15 minutes to dissolve the acetoacetanilide and then cooled to about 13° C. Then 283 parts of an aqueous sodium carbonate solution (17%) and 0.5 parts of a 50% solution of 2,4,7,9-tetramethyl-5-decyne-4,7-diol in ethylene glycol is added.

The diazonium salt slurry is then added with stirring over about 20 minutes to this alkaline acetoacetanilide slurry.

The temperature of coupling is about 23° to 27° C. and the pH-value is 8.5 to 9. The pH is maintained at this range by adding aqueous sodium carbonate solution (17%). The coupling mixture is stirred about one to one-and-a-half hours until a test with ammoniacal resorcinol shows no diazo present.

Separation step

The completed coupling mixture is then heated to 75° C. and adjusted to a pH of 5.0 to 5.3 by the slow (over about one hour) addition of 200 parts of hydrochloric acid (31%).

After the pH is stable for about 20 minutes, the precipitated product is filtered at 70° to 75° C. The filter (press) cake is washed with 2500 parts of cold water and sucked dry. Approximately 1250 parts of presscake are obtained with a solids content of 48.6% and 95% purity at a molecular weight of 376. The yield is 96% of theory.

Filtrates, rinse and washing waters are purified by treating them with activated carbon and then disposed off.

Metallization step

To a stirred solution of 48 parts of m-nitrobenzene sulfonic acid in 1000 parts of water at 60° C. 590 parts of an aqueous cobalt sulfate solution (8%) are added. Stirring is continued for 10 minutes, then 118 parts of an aqueous sodium carbonate solution (17%) and 50 parts of lignine sulfonate are added. The solution is heated to 70° to 75° C. and then 1250 parts of the monoazo press-cake is added over about 50 minutes.

The pH during metallization is maintained at 7.0 to 7.4 by adding about 330 parts of an aqueous sodium hydroxide solution (30%). The temperature is maintained at 70° to 75° C. and stirring is continued for two hours after the pH is stable.

3530 parts reaction mass slurry (28% solids content) of the yellow 1:2 cobalt complex azo dye of the formula

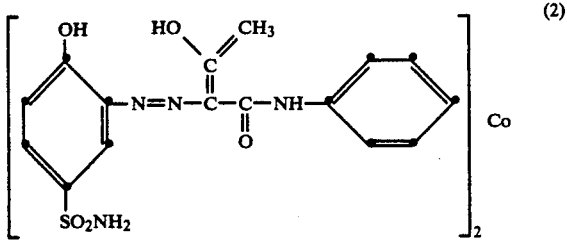

is obtained.

This dye slurry is then formulated into a liquid dye by milling a composition of

| | |
|---|---|
| 71.6% | of the dye slurry |
| 4.2% | of hexametaphosphate |
| 4.1% | of lignin sulfonate |
| 0.3% | of a fungicide |
| 19.8% | of water |
| 100.0% | | for four hours in an agitation kettle at ~350 rpm using a 4 mm glass beads.

The completed liquid dye preparation is obtained by filtering off the glass beads on a 60 mesh stainless steel screen. This dye preparation (which is a suspension) is of excellent (storage) stability and capable of dilution with water in all proportions.

We claim:

1. A process for the preparation of a concentrated, aqueous, liquid dye formulation containing from 10 to 35 percent by weight of a 1:2 metal-complex dye or a mixture of 1:2 metal-complex dyes comprising the steps of:
   (a) forming a moist filter cake comprising a metal-free azo or azomethine intermediate which is capable of metal complex formation and which contains at most one sulfonic acid group, the filter cake having a maximum sodium chloride less than about based on the dry weight;
   (b) metallizing the metal-free intermediate by combining said filter cake with a complex-forming metal salt to form an aqueous slurry of 1:2 metal-complex dye; and
   (c) diluting the aqueous slurry of 1:2 metal-complex dye to form the liquid dye formulation;
with the provisos that the liquid dye formulation is substantially free of organic solvents and lithium salts and that the process does not comprise a membrane separation step.

2. A process of claim 1 wherein the filter cake is formed by precipitating the intermediate from an aqueous reaction slurry at from 50° to 90° C. by adjusting the pH to from 2 to 5, filtering the precipitated aqueous reaction slurry at from 50° to 90° C. and washing the filtrate with water.

3. A process of claim 1 wherein the moist filter cake has a solids content of from 40 to 60 percent by weight.

4. A process of claim 1 wherein the aqueous slurry of 1:2 metal-complex dye is diluted with water containing one or more ingredients conventionally employed for liquid dye formulations selected from the group consisting of dispersants, surfactants, buffers, foam inhibitors, textile auxiliaries, humectants, liquefying agents, antifreeze agents and microbicides.

5. A process of claim 1 wherein the metal-free azo or azomethine intermediate is free from non-complex forming sulfonic and carboxylic acid groups.

6. A process of claim 1 wherein the metal-free azo or azomethine intermediate contains o,o',dihydroxy, o-hydroxy-o'-amino, o-hydroxy-o'-alkoxy, o-hydroxy-o'-carboxy, o,o'-dialkoxy or o-alkoxy-o'-amino azo or azomethine complex-forming groups.

7. A process of claim 1 wherein the metallization is carried out with a metal salt selected from the group consisting of chromium, cobalt, nickel, copper and iron salts.

8. A process of claim 7 wherein the metal salt is a cobalt salt.

9. A process of claim 8 wherein the metal salt is cobalt sulfate.

10. A process of claim 1 wherein the stoichiometric 1:2 mole ratio of complex-forming metal salt to metal-free azo or azomethine intermediate is used in the metallization step.

11. A process of claim 1 wherein the metallization step comprises combining the filter cake with an aqueous slurry containing the complex-forming metal salt, an oxidizing agent and a dispersant, with stirring, at a temperature of from 50° to 90° C. and a pH of from 3 to 13.

12. A process of claim 11 wherein the dispersant is selected from the group consisting of lignin sulfonates and condensation products of phenol-, cresol- or naphthalene-sulfonic acids with formaldehyde.

13. A process of claim 12 wherein the oxidizing agent is m-nitrobenzene sulfonic acid.

14. A process of claim 1 wherein liquid dye formulation contains from 15 to 25 percent by weight of the 1:2 metal-complex dye or the mixture of 1:2 metal-complex dyes.

15. A process of claim 1 which further comprises a wet-grinding step.

16. A process of claim 1 wherein the compound

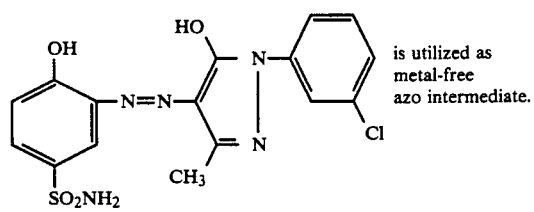

is utilized as metal-free azo intermediate.

17. A process of claim 1 wherein the compound

18. A process of claim 2 which further comprises utilizing a metal-free azo intermediate is selected from the group consisting of
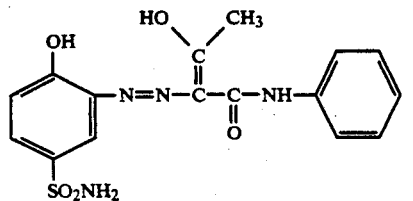
is utilized as metal-free azo intermediate.
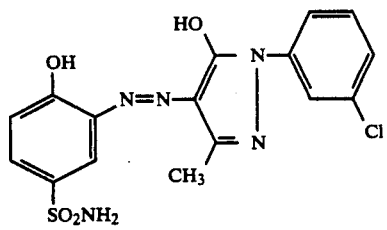
and
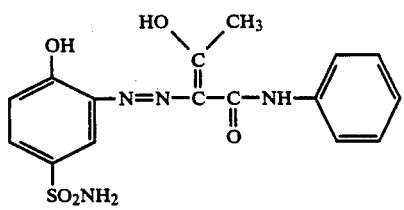
19. A process of claim 18 wherein the metal salt is cobalt sulfate.
20. A process of claim 19 which further comprises a wet-grinding step.
* * * * *

UNITED STATES PATENT AND TRADEMARK OFFICE
CERTIFICATE OF CORRECTION

PATENT NO. : 5,019,132

DATED : May 28, 1991

INVENTOR(S) : Davis et al.

It is certified that error appears in the above-identified patent and that said Letters Patent is hereby corrected as shown below:

Column 7, Claim 1, line 10, after "chloride" insert --content of--
and after "about" insert -- 1 percent--.

Signed and Sealed this

First Day of December, 1992

Attest:

DOUGLAS B. COMER

Attesting Officer

Acting Commissioner of Patents and Trademarks